US012632992B2

(12) United States Patent
Kim et al.

(10) Patent No.: US 12,632,992 B2
(45) Date of Patent: May 19, 2026

(54) APPARATUS AND METHOD FOR COMPRESSING THREE-DIMENSIONAL VOLUME DATA

(71) Applicant: Electronics and Telecommunications Research Institute, Daejeon (KR)

(72) Inventors: Soo-Woong Kim, Daejeon (KR); Jung-Won Kang, Daejeon (KR); Gun Bang, Daejeon (KR); Seong-Jun Bae, Daejeon (KR); Jin-Ho Lee, Daejeon (KR); Ha-Hyun Lee, Daejeon (KR); Sung-Chang Lim, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 811 days.

(21) Appl. No.: 17/981,251

(22) Filed: Nov. 4, 2022

(65) Prior Publication Data

US 2023/0169692 A1 Jun. 1, 2023

(30) Foreign Application Priority Data

Dec. 1, 2021 (KR) ........................ 10-2021-0170209
Jun. 7, 2022 (KR) ........................ 10-2022-0068781

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC .................................. G06T 9/001; G06T 9/40
See application file for complete search history.

(56) References Cited

U.S. PATENT DOCUMENTS 8,462,149 B2 6/2013 Lee et al.
8,610,710 B2 12/2013 Lim et al.
(Continued)

FOREIGN PATENT DOCUMENTS

CN 114820928 A * 7/2022 ........... G06T 17/005
KR 1020090110777 A 10/2009
(Continued)

OTHER PUBLICATIONS

Danhang Tang, Mingsong Dou, Peter Lincoln, Philip Davidson, Kaiwen Guo, Jonathan Taylor, Sean Fanello, Cem Keskin, Adarsh Kowdle, Sofien Bouaziz, Shahram Izadi, and Andrea Tagliasacchi. 2018. Real-time compression and streaming of 4D performances. ACM Trans. Graph. 37, 6, Article 256 (Dec. 2018) (Year: 2018).*
(Continued)

*Primary Examiner* — Charles T Shedrick
(74) *Attorney, Agent, or Firm* — Sughrue Mion, PLLC

(57) ABSTRACT

Disclosed herein are an apparatus and method for compressing 3D volume data. The apparatus for compressing three-dimensional (3D) volume data includes one or more processor, and execution memory configured to store at least one program that is executed by the one or more processors, wherein the at least one program is configured to receive 3D volume data for data compression, select necessary voxels that contribute to formation of a geometric surface from the 3D volume data using a marching cubes algorithm, represent location information of the selected necessary voxels by a tree structure, and binarize the location information of the necessary voxels by serializing the tree structure, and quantize truncated signed distance values to surfaces adjacent to the necessary voxels constituting a volume from the 3D volume data using the binarized location information of the necessary voxels.

6 Claims, 12 Drawing Sheets

ACTUAL GEOMETRIC PLANE
• OBSERVATION GEOMETRIC LOCATION OF SENSOR
★ VOXEL LOCATION
DISTANCE BETWEEN OBSERVATION GEOMETRIC LOCATION AND VOXEL

(56) References Cited

U.S. PATENT DOCUMENTS

| | | | | | |
|---|---|---|---|---|---|
| 8,884,953 | B2 * | 11/2014 | Chen | | G06T 9/004 |
| | | | | | 382/243 |
| 10,242,484 | B1 * | 3/2019 | Cernigliaro | | G06T 9/008 |
| 10,360,718 | B2 * | 7/2019 | Chernov | | G06T 17/20 |
| 11,055,921 | B2 | 7/2021 | Powers et al. | | |
| 11,163,418 | B2 * | 11/2021 | Zhou | | G06F 3/04815 |
| 2013/0107003 | A1 | 5/2013 | Lim et al. | | |
| 2017/0046868 | A1 * | 2/2017 | Chernov | | G06T 7/246 |
| 2019/0287273 | A1 * | 9/2019 | Yokose | | G06T 15/08 |
| 2021/0225074 | A1 * | 7/2021 | Meilland | | G06T 17/20 |
| 2023/0154051 | A1 * | 5/2023 | Tang | | G06T 17/00 |
| | | | | | 382/232 |
| 2023/0169692 | A1 * | 6/2023 | Kim | | G06T 9/40 |
| | | | | | 382/232 |
| 2025/0095216 | A1 * | 3/2025 | Kim | | G06T 9/002 |

FOREIGN PATENT DOCUMENTS

| | | | | | |
|---|---|---|---|---|---|
| KR | 10-2017-0020210 | A | | 2/2017 | |
| KR | 1020220039603 | A | | 3/2022 | |
| KR | 1020220069827 | A | | 5/2022 | |
| KR | 20250089494 | A | * | 6/2025 | G06N 3/09 |
| WO | WO-2021211133 | A1 | * | 10/2021 | G06T 9/002 |

OTHER PUBLICATIONS

A. F. R. Guarda, N. M. M. Rodrigues and F. Pereira, "Deep Learning-Based Point Cloud Coding: A Behavior and Performance Study," 2019 8th European Workshop on Visual Information Processing (EUVIP), Roma, Italy, 2019, pp. 34-39, doi: 10.1109/EUVIP47703.2019.8946211 (Year: 2019).*

M. Krivokuća, P. A. Chou and M. Koroteev, "A Volumetric Approach to Point Cloud Compression-Part II: Geometry Compression," in IEEE Transactions on Image Processing, vol. 29, pp. 2217-2229, 2020 (Year: 2020).*

P. A. Chou, M. Koroteev and M. Krivokuća, "A Volumetric Approach to Point Cloud Compression—Part I: Attribute Compression," in IEEE Transactions on Image Processing, vol. 29, pp. 2203-2216, 2020 (Year: 2020).*

Xiao, YP., Lai, YK., Zhang, FL et al. A survey on deep geometry learning: From a representation perspective. Comp. Visual Media 6, 113-133 (2020). https://doi.org/10.1007/s41095-020-0174-8 (Year: 2020).*

Malte Splietker et al., "Directional TSDF: Modeling Surface Orientation for Coherent Meshes", 2019 IEEE/RSJ International Conference on Intelligent Robots and Systems (IROS), Nov. 4-8, 2019, Macau, China, pp. 1727-1734 (8 pages total).

Emanuele Vespa, et al., "Adaptive-resolution octree-based volumetric SLAM", 2019 International Conference on 3D Vision (3DV), IEEE, 2019, pp. 654-662 (9 pages total).

* cited by examiner

------- ACTUAL GEOMETRIC PLANE

⊛   OBSERVATION GEOMETRIC LOCATION
    OF SENSOR

⋆   VOXEL LOCATION

_____ DISTANCE BETWEEN OBSERVATION
       GEOMETRIC LOCATION AND VOXEL

SINGLE-RESOLUTION TSDF VOLUME

————— ACTUAL GEOMETRIC SURFACE

- - - - - - - RECONSTRUCTED GEOMETRIC SURFACE

MULTI-RESOLUTION TSDF VOLUME

———— ACTUAL GEOMETRIC SURFACE

------- RECONSTRUCTED GEOMETRIC SURFACE

VOXELS THAT CONTRIBUTE TO FORMATION OF GEOMETRIC SURFACE

VOXELS THAT DO NOT CONTRIBUTE TO FORMATION OF GEOMETRIC SURFACE

TREE SERIALIZATION: 1011, 0001, 1111, 0101
NODE DEPTH SERIALIZATION: 3, 2, 1
TSDF VALUE SERIALIZATION: -1.0 -1.0, -0.2, +0.2, +0.9, +1.0, -0.5

START

RECEIVE TSDF VOLUME DATA — S110

SELECT NECESSARY VOXELS — S120

REPRESENT TSDF VOLUME BY TREE STRUCTURE — S130

SERIALIZE TSDF VOLUME — S140

QUANTIZE TSDF VOLUME — S150

ENCODE TSDF VOLUME DATA — S160

OUTPUT BITSTREAM — S170

END

APPARATUS AND METHOD FOR COMPRESSING THREE-DIMENSIONAL VOLUME DATA

CROSS REFERENCE TO RELATED APPLICATIONS

This application claims priority to Korean Patent Application Nos. 10-2021-0170209, filed Dec. 1, 2021 and 10-2022-0068781, filed Jun. 7, 2022, in the Korean Intellectual Property Office, which are hereby incorporated by reference in their entireties into this application.

BACKGROUND OF THE INVENTION

1. Technical Field

The present invention relates generally to technology for compressing three-dimensional (3D) volume data and, more particularly to technology for processing volume data representing a 3D surface by a format that enables encoding to be facilitated.

2. Description of the Related Art

A Truncated Signed Distance Function (or Truncated Signed Distance
Field, TSDF) fusion algorithm generates an implicit surface representation called a TSDF volume by fusing information about distances of surrounding scenes, observed at multiple viewpoints by a distance measurement system, such as a depth sensor or a stereo camera, into a single volume (voxel grid) structure. The TSDF volume visualizes a three-dimensional (3D) surface contained in data through volume rendering based on raycasting or through mesh extraction using a marching cubes algorithm. However, because the quality of the visualized 3D surface is dependent on the resolution of a voxel grid, and the amount of data in a TSDF volume greatly increases as the resolution of the voxel grid is higher, there is required an efficient data reduction and encoding method so as to store or transmit a high-resolution TSDF volume.

The quality of a 3D surface represented by a TSDF volume is dependent on the resolution of a voxel grid used when the TSDF volume is generated. There is trade-off difficulty in that a high-resolution voxel grid must be used to maintain the high quality of a 3D surface, but the amount of data increases due to the use of the high-resolution voxel grid. In order to reduce the amount of data in the TSDF volume, a multi-resolution TSDF volume may be configured by adaptively decreasing the resolution of a voxel grid in a region having a simple 3D surface for respective regions, but this complicates the TSDF volume structure due to setting of different resolutions for respective regions.

Generally, a TSDF fusion algorithm is configured such that, in order to generate a hole-free watertight 3D surface representation, not only voxels located on a geometric surface observed by a depth sensor but also adjacent voxels are stored in the
TSDF volume, thus enabling a large number of voxels that do not contribute to the generation of a 3D surface at a visualization step to be included in the TSDF volume. In order to efficiently reduce data, there is required a method for selecting voxels that are used for 3D surface generation or voxels that are not used for 3D surface generation.

Meanwhile, Korean Patent Application Publication No. 10-2022-0069827 entitled "Method and Apparatus for transforming 3-dimensional Volume Resolution Using Truncated Signed Distance Function" discloses a method and apparatus for transforming a 3D volume resolution using a TSDF, which transform a low-resolution 3D volume into a high-resolution 3D volume.

SUMMARY OF THE INVENTION

Accordingly, the present invention has been made keeping in mind the above problems occurring in the prior art, and an object of the present invention is to efficiently compress 3D volume data, regardless of a 3D volume structure (having single resolution or multi-resolution) and a phase change.

In accordance with an aspect of the present invention to accomplish the above object, there is provided an apparatus for compressing three-dimensional (3D) volume data, including one or more processor and execution memory configured to store at least one program that is executed by the one or more processors, wherein the at least one program is configured to receive 3D volume data for data compression, select necessary voxels that contribute to formation of a geometric surface from the 3D volume data using a marching cubes algorithm, represent location information of the selected necessary voxels by a tree structure, and binarize the location information of the necessary voxels by serializing the tree structure, and quantize truncated signed distance values to surfaces adjacent to the necessary voxels constituting a volume from the 3D volume data using the binarized location information of the necessary voxels.

The at least one program may be configured to visualize the 3D volume data as a mesh representation using the marching cubes algorithm.

The at least one program may be configured to calculate marching cubes mesh patterns of voxels adjacent to a volume visualized as the mesh representation and then select voxels having a preset marching cubes mesh pattern as the necessary voxels.

The at least one program may be configured to serialize resolution information of the necessary voxels and the truncated signed distance values in an order of binarization of the necessary voxels.

The at least one program may be configured to perform quantization such that bits are assigned adaptively to a representation of the truncated signed distance values based on resolutions of the necessary voxels.

In accordance with another aspect of the present invention to accomplish the above object, there is provided a method for compressing three-dimensional (3D) volume data, the method being performed by a 3D volume data compression apparatus, the method including receiving 3D volume data for data compression, selecting necessary voxels that contribute to formation of a geometric surface from the 3D volume data using a marching cubes algorithm, representing location information of the selected necessary voxels by a tree structure, and binarizing the location information of the necessary voxels by serializing the tree structure, and quantizing truncated signed distance values to surfaces adjacent to the necessary voxels constituting a volume from the 3D volume data using the binarized location information of the necessary voxels.

Selecting the necessary voxels may include visualizing the 3D volume data as a mesh representation using the marching cubes algorithm.

Selecting the necessary voxels may further include calculating marching cubes mesh patterns of voxels adjacent to a volume visualized as the mesh representation and then selecting voxels having a preset marching cubes mesh pattern as the necessary voxels.

Binarizing the location information may include serializing resolution information of the necessary voxels and the truncated signed distance values in an order of binarization of the necessary voxels.

Quantizing the truncated signed distance values may include performing quantization such that bits are assigned adaptively to a representation of the truncated signed distance values based on resolutions of the necessary voxels.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
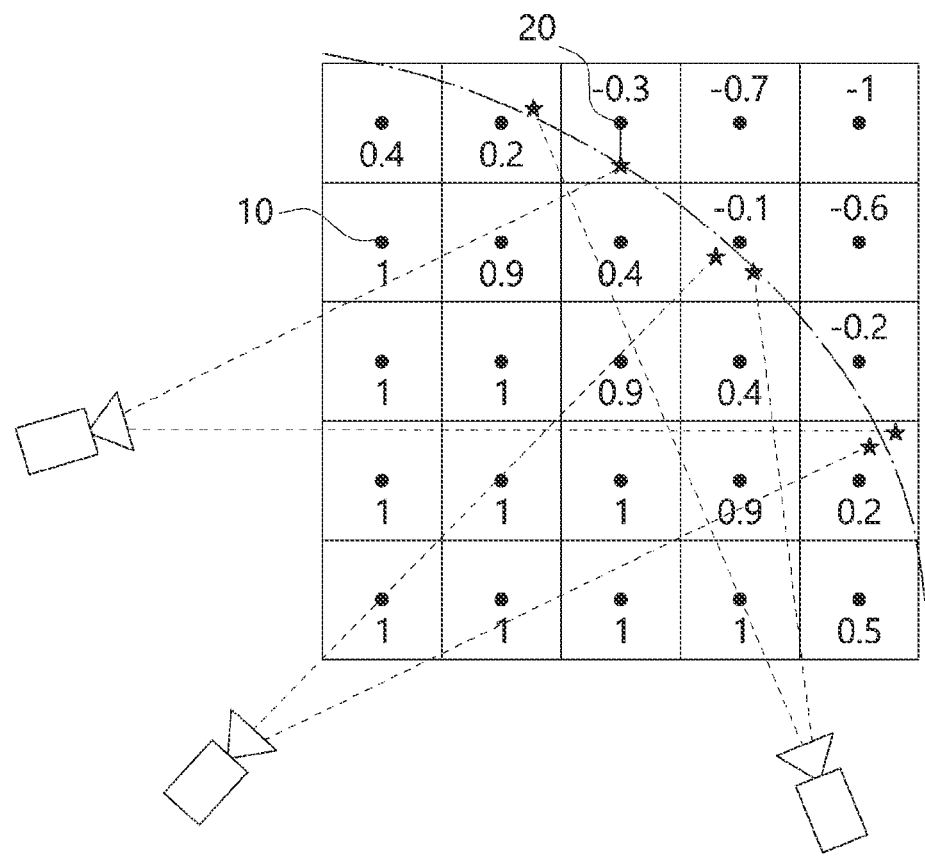
FIG. 1 is a diagram illustrating a TSDF depth fusion algorithm according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

FIG. 1 is a diagram illustrating a TSDF depth fusion algorithm according to an embodiment of the present invention.

Referring to FIG. 1, it can be seen that a TSDF depth fusion algorithm is illustrated.

The TSDF depth fusion algorithm may generate an implicit surface representation by fusing pieces of information about distances to observation geometric surfaces acquired by depth sensors at various viewpoints into a single 3D volume (voxel grid).

Here, the TSDF depth fusion algorithm may simply and rapidly obtain geometric surface data for the entire scene.

As illustrated in FIG. 1, the TSDF depth fusion algorithm may record truncated signed distances to surfaces adjacent to respective voxels constituting a TSDF volume.

Here, the TSDF depth fusion algorithm may adjust a signed distance value to a voxel located farther away from the observation geometric location so that the distance value has a value between −1 and 1 by truncating the signed distance value (10).

Here, the TSDF depth fusion algorithm may normalize and store signed distance values between respective voxels and observation geometric locations closest thereto, for respective voxels (20).

Figure 2:
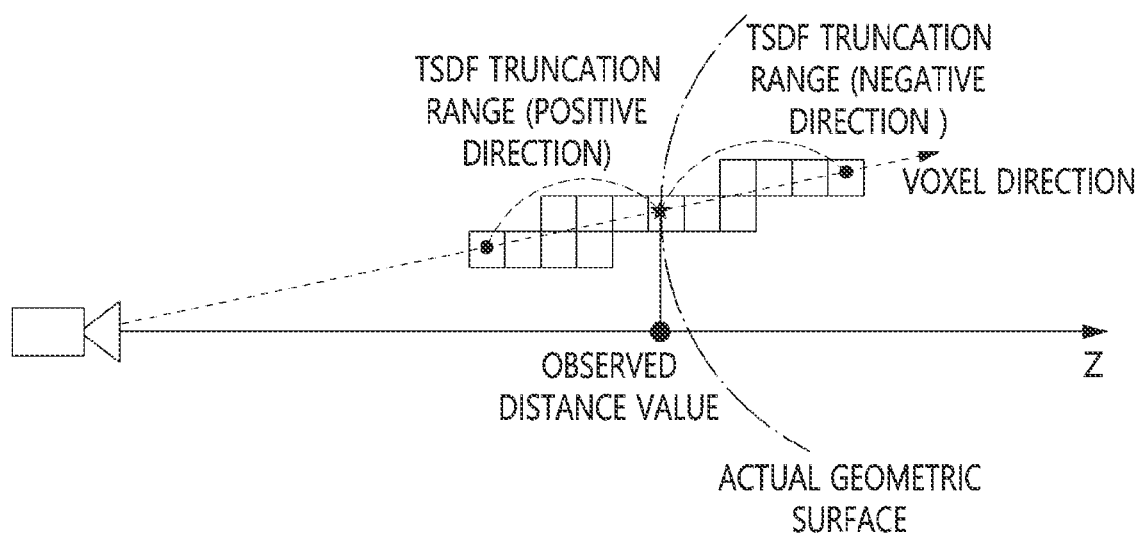
FIG. 2 is a diagram illustrating a voxel allocation process in a TSDF depth fusion algorithm according to an embodiment of the present invention.

FIG. 2 is a diagram illustrating a voxel allocation process in a TSDF depth fusion algorithm according to an embodiment of the present invention.

Referring to FIG. 2, it can be seen that the TSDF depth fusion algorithm allocates not only voxels located on an observation geometric surface but also voxels adjacent to a geometric surface within a preset TSDF truncation range, and stores the allocated voxels in the TSDF volume.

Figure 3:
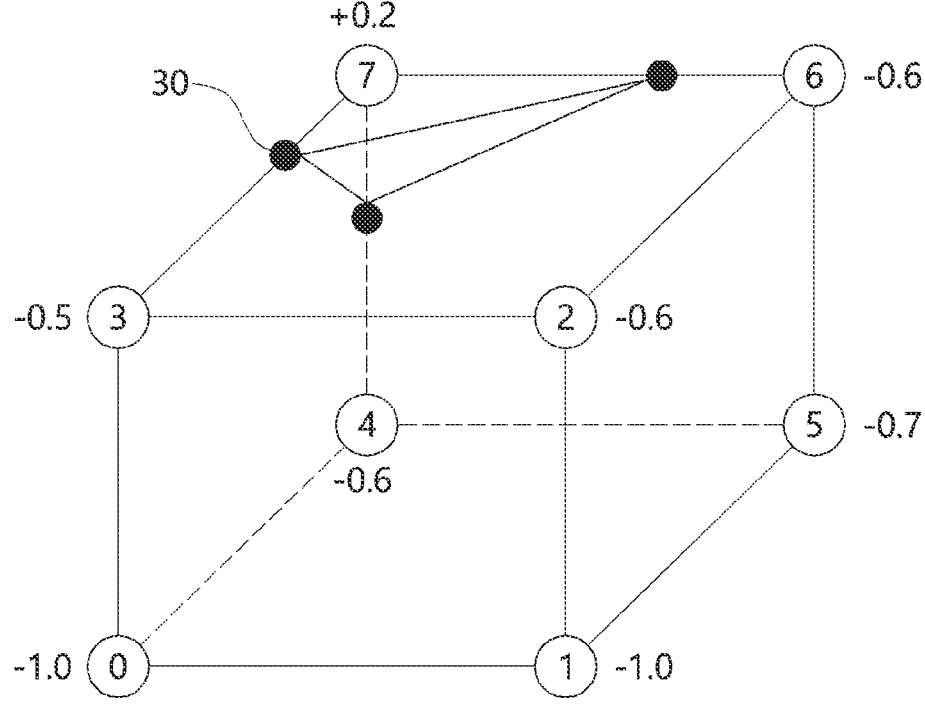
FIG. 3 is a diagram illustrating a TSDF volume meshing process using a marching cubes algorithm according to an embodiment of the present invention.

FIG. 3 is a diagram illustrating a TSDF volume meshing process using a marching cubes algorithm according to an embodiment of the present invention.

Referring to FIG. 3, a TSDF volume may be simply and rapidly transformed into and visualized as a mesh representation using the marching cubes algorithm.

The marching cubes algorithm may compare the signs of TSDF values of eight adjacent voxels with each other, may select one of predefined 256 mesh patterns ranging from 0 to 255, and may calculate the locations of the vertices of the selected mesh pattern by interpolating the magnitudes of the TSDF values.

As illustrated in FIG. 3, the marching cubes algorithm may configure a cube having 12 edges by connecting adjacent eight voxels, and may generate mesh vertices on edges at which the signs of the TSDF values are changed.

The generated vertices may be connected so as to form any one of predefined 256 mesh patterns ranging from 0 to 255 by comparing the signs of eight TSDF values with each other.

For example, it can be seen that a vertex is generated at a 5:2 point of an edge connecting voxel 3 to voxel 7 (30).

Figure 4:
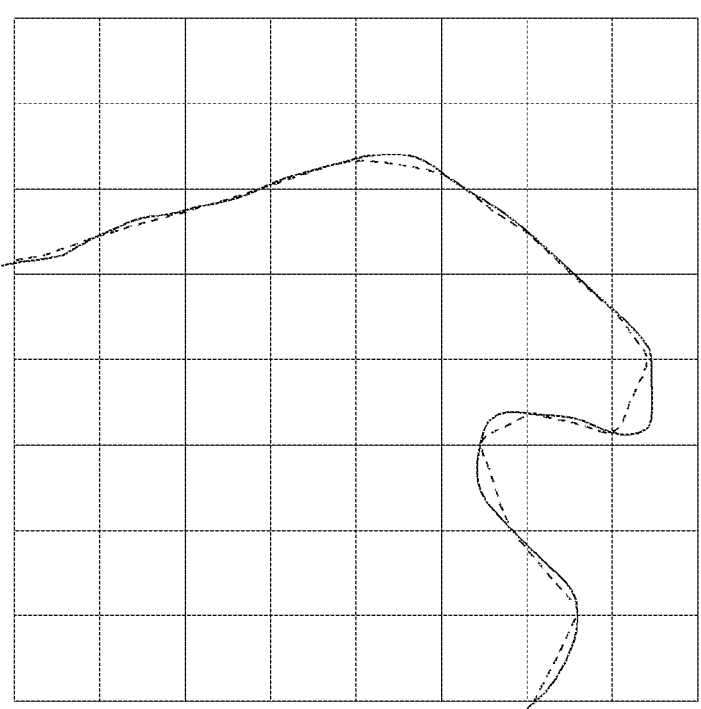
FIG. 4 is a diagram illustrating a single-resolution TSDF volume according to an embodiment of the present invention.
Figure 5:
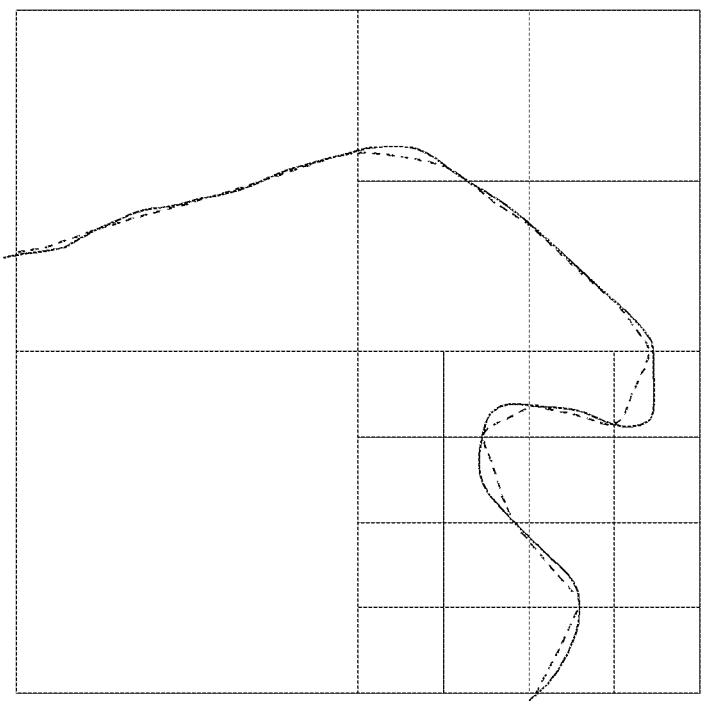
FIG. 5 is a diagram illustrating a multi-resolution TSDF volume according to an embodiment of the present invention.

FIG. 4 is a diagram illustrating a single-resolution TSDF volume according to an embodiment of the present invention. FIG. 5 is a diagram illustrating a multi-resolution TSDF volume according to an embodiment of the present invention.

Referring to FIG. 4, the single-resolution TSDF volume may be transformed into a multi-resolution TSDF volume by adjusting resolution (voxel size) adaptively to local geometric complexity.

Referring to FIG. 5, the multi-resolution TSDF volume may represent a similar geometric surface even if fewer voxels are generated than those in the single-resolution TSDF volume are generated, but the multi-resolution TSDF volume cannot be easily stored due to a relatively complicated voxel grid structure.

Figure 6:
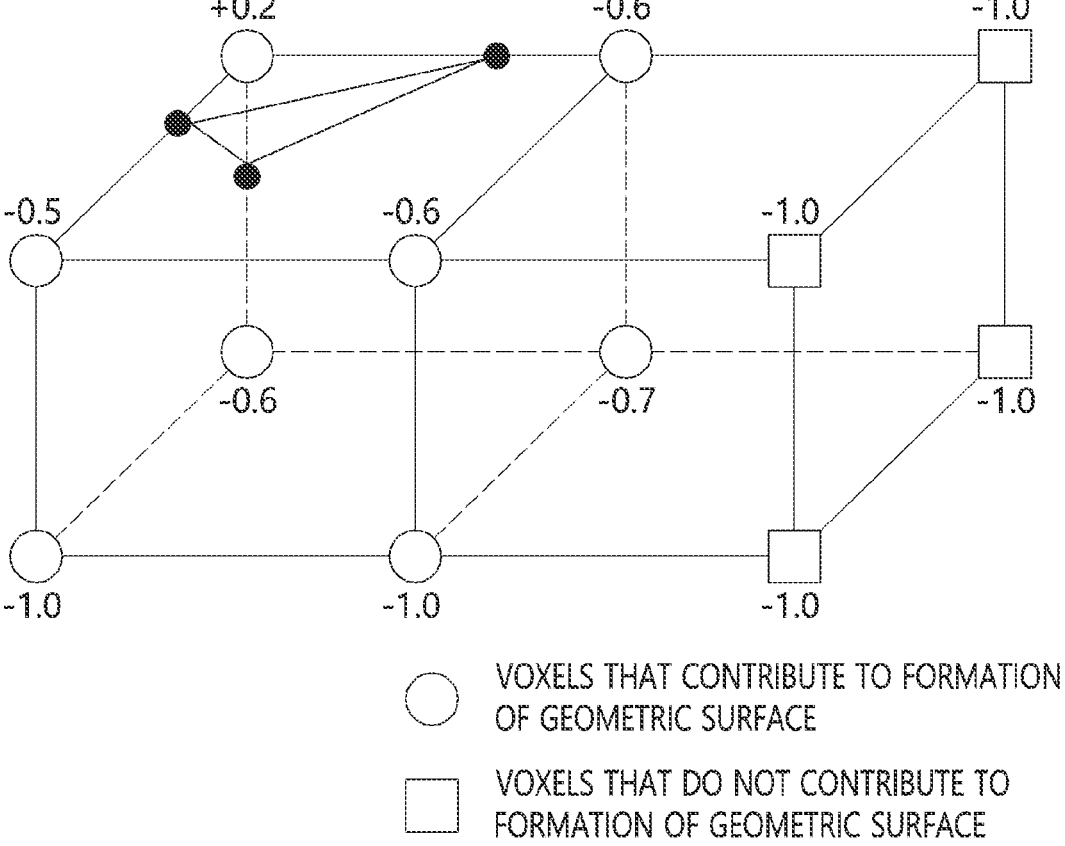
FIG. 6 is a diagram illustrating the results of necessary voxel classification according to an embodiment of the present invention.

FIG. 6 is a diagram illustrating the results of classification of necessary voxels according to an embodiment of the present invention.

Referring to FIG. 6, all of eight adjacent voxels may be investigated in a single-resolution or multi-resolution TSDF volume, and may be classified into necessary voxels contributing to formation of a geometric representation, and the remaining (unnecessary) voxels.

Here, the eight adjacent voxels may be used to calculate marching cubes mesh patterns. In this case, when mesh pattern 0 or mesh pattern 255 is generated, the corresponding voxel may be classified as an unnecessary voxel, whereas when a mesh pattern from 1 to 254 is generated, the corresponding voxel may be classified as a necessary voxel.

The unnecessary voxels that do not contribute to formation of a geometric surface may be excluded from a compression target or a storage target, thus reducing the amount of data in the TSDF volume.

Figure 7:
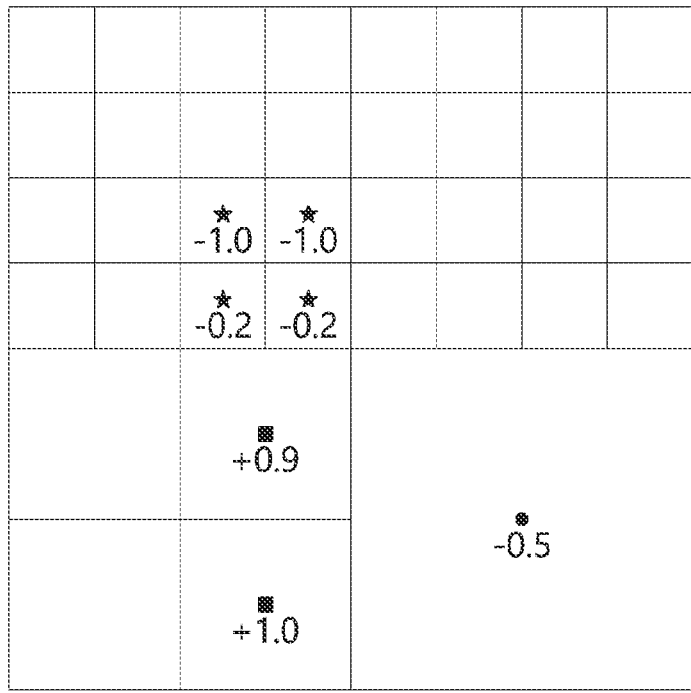
FIGS. 7 and 8 are diagrams illustrating a tree serialization process for a TSDF volume according to an embodiment of the present invention.
Figure 8:
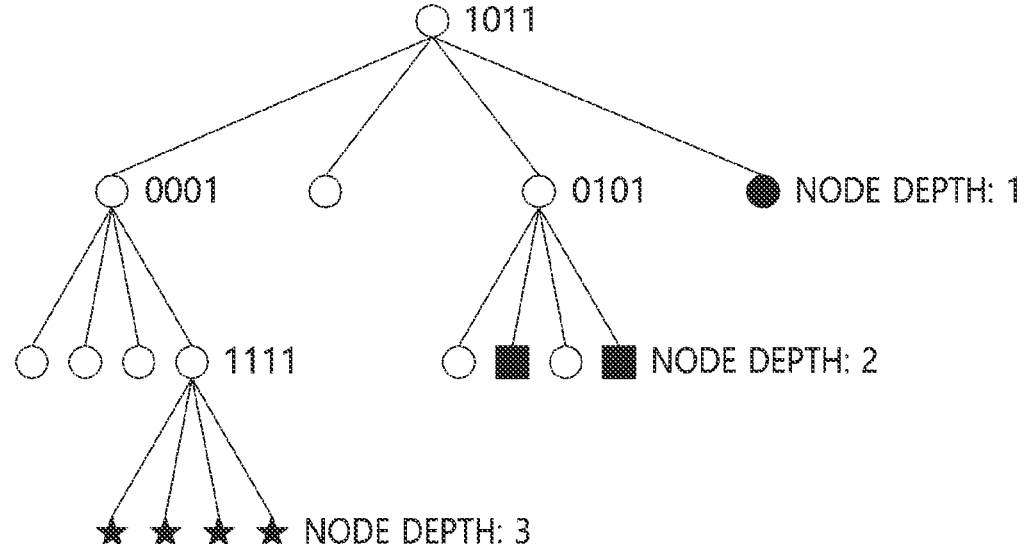

FIGS. 7 and 8 are diagrams illustrating a tree serialization process for a TSDF volume according to an embodiment of the present invention.

Referring to FIGS. 7 and 8, the locations of necessary voxel data may be represented by octrees and may be serialized and binarized.

The location information of voxels may be represented by a tree structure, and may be binarized by serializing the tree structure.

For respective voxels, the resolution information of the voxels may be serialized in the order of binarization.

For respective voxels, the TSDF values of the voxels may be serialized in the order of binarization.

Serialized voxel locations, resolution information, and TSDF values may be represented by a bitstream, and may be used as the encoding input of the TSDF volume.

Figure 9:
FIG. 9 is a diagram illustrating a TSDF quantization process according to an embodiment of the present invention.

FIG. 9 is a diagram illustrating a TSDF quantization process according to an embodiment of the present invention.

Referring to FIG. 9, it can be seen that TSDF values are generally represented by floating point numbers, whereby quantization is performed for efficient encoding.

Although both uniform quantization and non-uniform quantization may be applied, quantization may be performed such that the signs of TSDF values are not changed due to quantization in order to prevent the phases of meshes generated from the TSDF volume from being changed.

Here, uniform quantization may be performed on input TSDF values 41 to obtain TSDF quantization results 42, and coding may be performed to obtain TSDF coded results 43.

Figure 10:
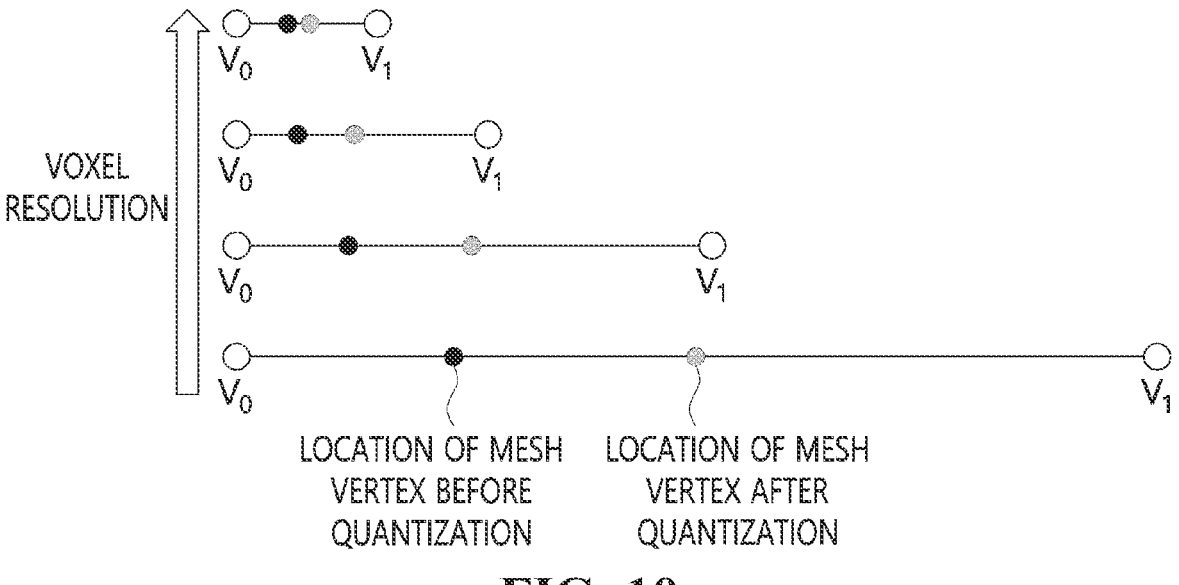
FIG. 10 is a diagram illustrating an adaptive TSDF quantization process depending on the voxel resolution according to an embodiment of the present invention.

FIG. 10 is a diagram illustrating an adaptive TSDF quantization process depending on the voxel resolution according to an embodiment of the present invention.

Referring to FIG. 10, when the same quantization (uniform quantization) is performed on all TSDF values of a multi-resolution TSDF volume, an error in the locations of mesh vertices generated in a voxel having low resolution may be further increased.

Therefore, differential quantization may be performed on the multi-resolution TSDF volume depending on the voxel resolution.

A voxel having high resolution may be quantized such that fewer bits are allocated to a TSDF value representation.

A voxel having low resolution may be quantized such that more bits are allocated to a TSDF value representation.

Figure 11:
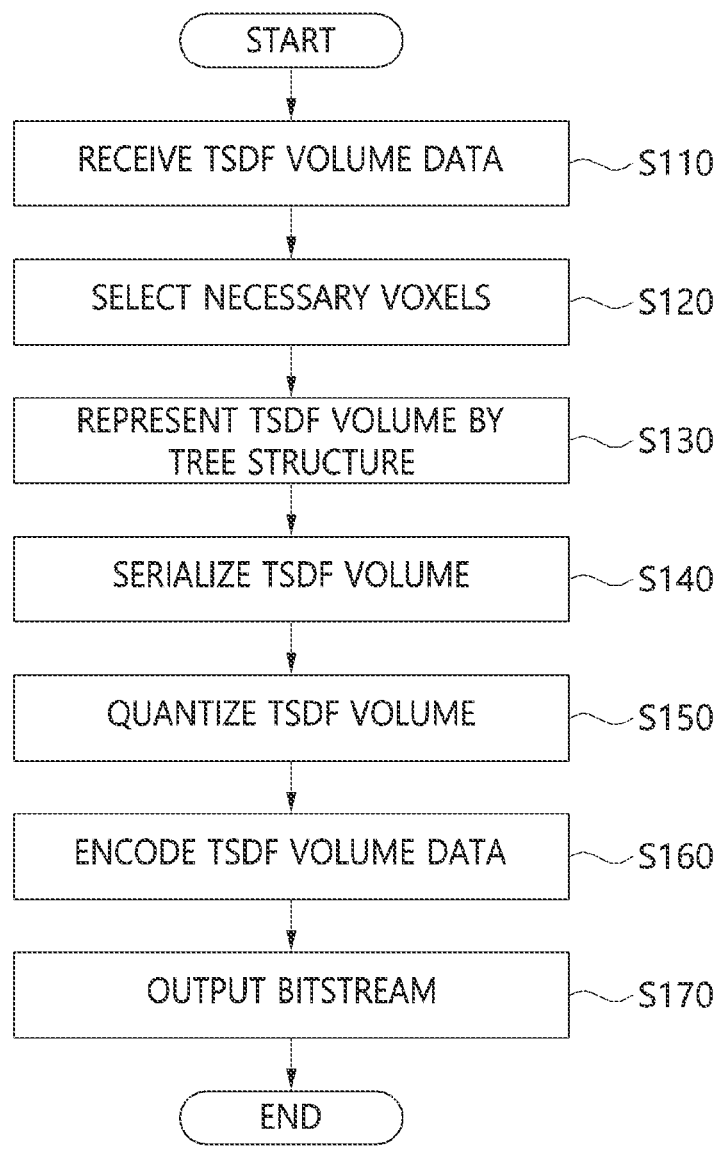
FIG. 11 is an operation flowchart illustrating a method for compressing 3D volume data according to an embodiment of the present invention.

FIG. 11 is an operation flowchart illustrating a method for compressing 3D volume data according to an embodiment of the present invention.

Referring to FIG. 11, the 3D volume data compression method according to the embodiment of the present invention may receive TSDF volume data at step S110.

That is, at step S110, TSDF volume data for data compression may be received.

Further, the 3D volume data compression method according to the embodiment of the present invention may select necessary voxels at step S120.

That is, at step S120, necessary voxels contributing to formation of a geometric surface may be selected from the TSDF volume data using a marching cubes algorithm.

Here, at step S120, the TSDF volume data may be transformed into a mesh representation using the marching cubes algorithm.

At step S120, a cube having edges may be configured by connecting adjacent voxels to the TSDF volume visualized as a mesh representation, and mesh vertices may be generated on edges on which the signs of TSDF values are changed.

At step S120, the voxels may be connected to form one of 256 mesh patterns ranging from 0 to 255 by comparing the signs of the generated vertices and the voxels with each other.

Here, at step S120, the signs of TSDF values of eight adjacent voxels may be compared with each other using the marching cubes algorithm, one of predefined 256 mesh patterns ranging from 0 to 255 may be selected, and the locations of the vertices of the selected mesh pattern may be calculated by interpolating the magnitudes of the TSDF values.

The TSDF values may correspond to truncated signed distance values to surfaces adjacent to respective voxels forming a 3D volume.

Here, at step S120, marching cubes patterns of the voxels adjacent to the volume visualized from the 3D volume data may be calculated using the marching cubes algorithm, and voxels having a preset marching cubes mesh pattern may be selected as the necessary voxels.

At step S120, the marching cubes mesh patterns of the eight adjacent voxels may be calculated, and the voxels may be classified in such a way that, when mesh pattern 0 or 255 is generated, the corresponding voxel is classified as an unnecessary voxel, and when a mess pattern corresponding to a number ranging from 1 to 254 is generated, the corresponding voxel may be classified as a necessary voxel.

Here, at step S120, unnecessary voxels that do not contribute to formation (generation) of a geometric surface may be excluded from a compression target or a storage target, thus reducing the amount of data in the TSDF volume.

Further, the 3D volume data compression method according to the embodiment of the present invention may represent the TSDF volume by a tree structure at step S130.

That is, at step S130, location information of the selected necessary voxels may be represented by a tree structure.

Furthermore, the 3D volume data compression method according to the embodiment of the present invention may serialize the TSDF volume at step S140.

That is, at step S140, the tree structure may be serialized, and thus the location information of the necessary voxels may be binarized.

At step S140, the resolution information of the necessary voxels may be serialized in the order of binarization of the necessary voxels.

At step S140, the TSDF values of the necessary voxels may be serialized in the order of binarization of the necessary voxels.

Next, the 3D volume data compression method according to the embodiment of the present invention may perform quantization on the TSDF volume at step S150.

That is, at step S150, quantization for encoding of the binarized TSDF values may be performed.

At step S150, differential quantization may be performed depending on the voxel resolution of a multi-resolution TSDF volume.

Here, at step S150, quantization may be performed such that bits are assigned adaptively to the representation of the truncated signed distance values (TSDF values) based on the resolutions of the necessary voxels.

In detail, at step S150, a necessary voxel having high resolution may be quantized such that fewer bits are allocated to a TSDF value representation.

Further, at step S150, a necessary voxel having low resolution may be quantized such that more bits are allocated to a TSDF value representation.

Next, the 3D volume data compression method according to the embodiment of the present invention may encode the TSDF volume data at step S160.

That is, at step S160, the quantized TSDF values may be encoded.

Furthermore, the 3D volume data compression method according to the embodiment of the present invention may output a bitstream at step S170.

Serialized voxel locations, resolution information, and TSDF values may be represented by a bitstream, and may be used as the encoding input of the TSDF volume.

Figure 12:
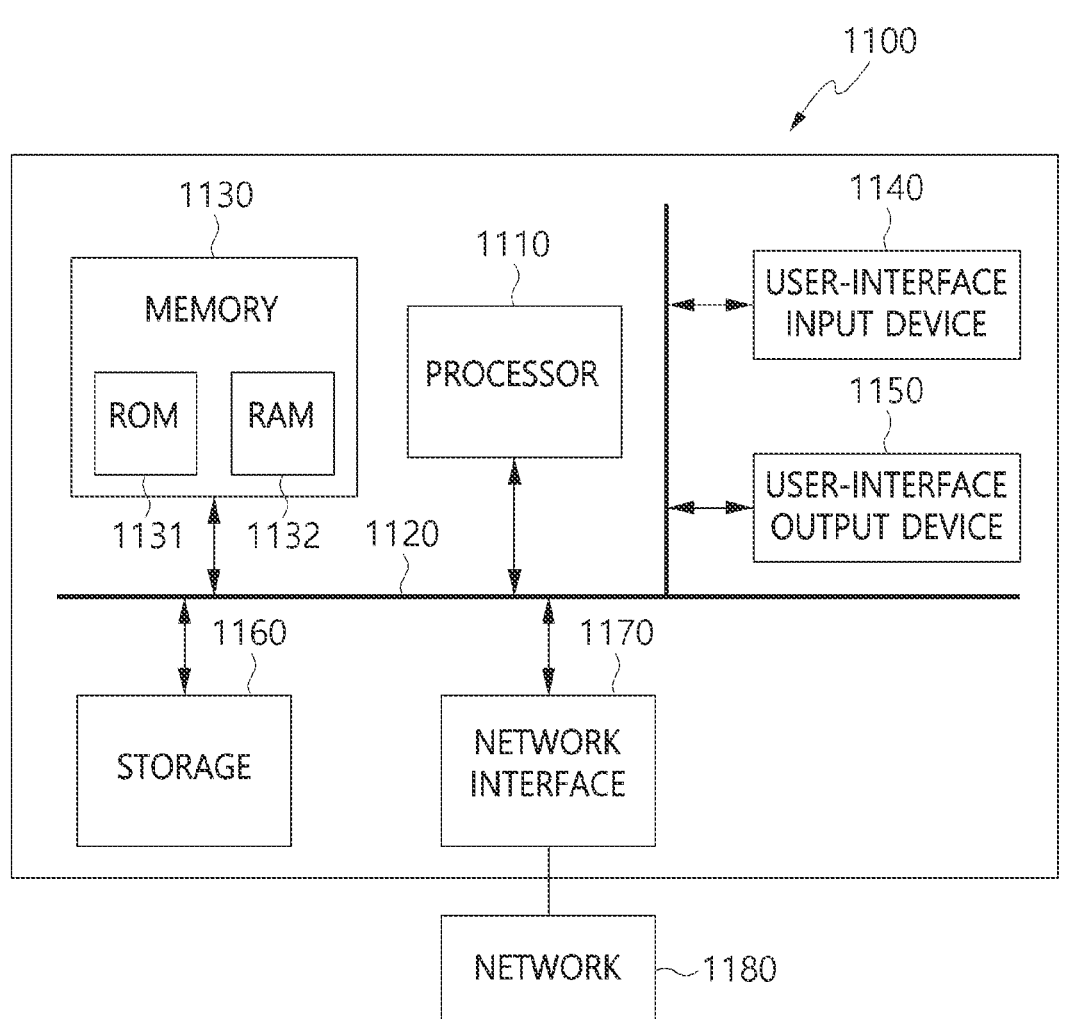
FIG. 12 is a diagram illustrating a computer system according to an embodiment of the present invention.

FIG. 12 is a diagram illustrating a computer system according to an embodiment of the present invention.

Referring to FIG. 12, an apparatus for compressing 3D volume data according to an embodiment of the present invention may be implemented in a computer system 1100, such as a computer-readable storage medium. As illustrated in FIG. 12, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for compressing 3D volume data according to an embodiment of the present invention may include one or more processors 1110 and execution memory 1130 for storing at least one program executed by the one or more processors 1110, wherein the at least one program is configured to receive 3D volume data for data compression, select necessary voxels that contribute to formation of a geometric surface from the 3D volume data using a marching cubes algorithm, represent location information of the selected necessary voxels by a tree structure, and binarize the location information of the necessary voxels by serializing the tree structure, and quantize truncated signed distance values to surfaces adjacent to the necessary voxels constituting a volume from the 3D volume data using the binarized location information of the necessary voxels.

The at least one program may be configured to visualize the 3D volume data as a mesh representation using the marching cubes algorithm.

The at least one program may be configured to calculate marching cubes mesh patterns of voxels adjacent to a volume visualized as the mesh representation and then select voxels having a preset marching cubes mesh pattern as the necessary voxels.

The at least one program may be configured to serialize resolution information of the necessary voxels and the truncated signed distance values in an order of binarization of the necessary voxels.

The at least one program may be configured to perform quantization such that bits are assigned adaptively to a representation of the truncated signed distance values based on resolutions of the necessary voxels.

The present invention may efficiently compress 3D volume data, regardless of a 3D volume structure (having single resolution or multi-resolution) and a phase change.

As described above, in the apparatus and method for compressing 3D volume data according to the present invention, the configurations and schemes in the above-described embodiments are not limitedly applied, and some or all of the above embodiments can be selectively combined and configured so that various modifications are possible.

What is claimed is:

1. An apparatus for compressing three-dimensional (3D) volume data, comprising:

one or more processor; and an execution memory configured to store at least one program that is executed by the one or more processors, wherein the at least one program is configured to:

receive 3D volume data for data compression, select necessary voxels that contribute to formation of a geometric surface from the 3D volume data using a marching cubes algorithm, represent location information of the selected necessary voxels by a tree structure, and binarize the location information of the necessary voxels by serializing the tree structure, and quantize truncated signed distance values to surfaces adjacent to the necessary voxels constituting a volume from the 3D volume data using the binarized location information of the necessary voxels, wherein the at least one program is configured to:

serialize resolution information of the necessary voxels and the truncated signed distance values in an order of binarization of the necessary voxels;

perform quantization by adaptively assigning bits to a representation of the truncated signed distance values based on resolutions of the necessary voxels; and assign a first number of bits to a representation of the truncated signed distance values for a necessary voxel having a first resolution, and assign a second number of bits, which is greater than the first number of bits, to a representation of the truncated signed distance values for a necessary voxel having a second resolution that is lower than the first resolution.

2. The apparatus of claim 1, wherein the at least one program is configured to visualize the 3D volume data as a mesh representation using the marching cubes algorithm.

3. The apparatus of claim 2, wherein the at least one program is configured to calculate marching cubes mesh patterns of voxels adjacent to a volume visualized as the mesh representation and then select voxels having a preset marching cubes mesh pattern as the necessary voxels.

4. A method for compressing three-dimensional (3D) volume data, the method being performed by a 3D volume data compression apparatus, the method comprising:

receiving 3D volume data for data compression;

selecting necessary voxels that contribute to formation of a geometric surface from the 3D volume data using a marching cubes algorithm;

representing location information of the selected necessary voxels by a tree structure, and binarizing the location information of the necessary voxels by serializing the tree structure; and quantizing truncated signed distance values to surfaces adjacent to the necessary voxels constituting a volume from the 3D volume data using the binarized location information of the necessary voxels, wherein the binarizing of the location information comprises serializing resolution information of the necessary voxels and the truncated signed distance values in an order of binarization of the necessary voxels, and wherein the quantizing of the truncated signed distance values comprises:

performing quantization by adaptively assigning bits to a representation of the truncated signed distance values based on resolutions of the necessary voxels; and assigning a first number of bits to a representation of the truncated signed distance values for a necessary voxel having a first resolution, and assigning a second number of bits, which is greater than the first number of bits, to a representation of the truncated signed distance values for a necessary voxel having a second resolution that is lower than the first resolution.

5. The method of claim 4, wherein selecting the necessary voxels comprises:

visualizing the 3D volume data as a mesh representation using the marching cubes algorithm.

6. The method of claim 5, wherein selecting the necessary voxels further comprises:

calculating marching cubes mesh patterns of voxels adjacent to a volume visualized as the mesh representation and then selecting voxels having a preset marching cubes mesh pattern as the necessary voxels.

\*  \*  \*  \*  \*